(12) United States Patent  (10) Patent No.: US 7,505,892 B2
Foderaro  (45) Date of Patent: Mar. 17, 2009

(54) MULTI-PERSONALITY CHAT ROBOT

(75) Inventor: John K. Foderaro, Alameda, CA (US)

(73) Assignee: Epistle LLC, Oakland, CA (US)

( * ) Notice: Subject to any disclaimer, the term of this patent is extended or adjusted under 35 U.S.C. 154(b) by 1232 days.

(21) Appl. No.: 10/619,973

(22) Filed: Jul. 15, 2003

(65) Prior Publication Data

US 2005/0015350 A1  Jan. 20, 2005

(51) Int. Cl.
*G06F 17/20* (2006.01)
*G06N 5/02* (2006.01)

(52) U.S. Cl. .................. 704/1; 704/9; 706/55
(58) Field of Classification Search ............ 704/10, 704/269, 1, 9, 257, 270, 275; 706/26, 45, 706/46, 55
See application file for complete search history.

(56) References Cited

U.S. PATENT DOCUMENTS

| | | | | |
|---|---|---|---|---|
| 5,974,413 | A * | 10/1999 | Beauregard et al. | 707/6 |
| 5,987,415 | A * | 11/1999 | Breese et al. | 704/270 |
| 6,212,502 | B1 * | 4/2001 | Ball et al. | 704/270 |
| 6,259,969 | B1 * | 7/2001 | Tackett et al. | 700/264 |
| 6,317,486 | B1 * | 11/2001 | Hollins et al. | 379/88.23 |
| 6,438,545 | B1 * | 8/2002 | Beauregard et al. | 707/6 |
| 6,604,090 | B1 * | 8/2003 | Tackett et al. | 706/11 |
| 6,604,094 | B1 * | 8/2003 | Harris | 706/48 |
| 6,658,388 | B1 * | 12/2003 | Kleindienst et al. | 704/275 |
| RE39,090 | E * | 5/2006 | Beauregard et al. | 707/6 |
| 7,263,474 | B2 * | 8/2007 | Fables et al. | 703/6 |
| 7,269,802 | B1 * | 9/2007 | Kurzweil et al. | 715/867 |
| 7,328,196 | B2 * | 2/2008 | Peters, II | 706/14 |
| 2002/0010584 | A1 * | 1/2002 | Schultz et al. | 704/270 |
| 2002/0156774 | A1 * | 10/2002 | Beauregard et al. | 707/3 |
| 2002/0198697 | A1 * | 12/2002 | Datig | 704/1 |
| 2003/0028498 | A1 * | 2/2003 | Hayes-Roth | 706/17 |
| 2003/0187660 | A1 * | 10/2003 | Gong | 704/277 |
| 2003/0216919 | A1 * | 11/2003 | Roushar | 704/260 |
| 2004/0019485 | A1 * | 1/2004 | Kobayashi et al. | 704/260 |
| 2004/0075677 | A1 * | 4/2004 | Loyall et al. | 345/706 |
| 2005/0022114 | A1 * | 1/2005 | Shanahan et al. | 715/513 |
| 2007/0219933 | A1 * | 9/2007 | Datig | 706/4 |

* cited by examiner

*Primary Examiner*—Martin Lerner
(74) *Attorney, Agent, or Firm*—Roger Schlafly

(57) ABSTRACT

A method and system for efficiently incorporating multiple personalities into a robot. The robot acts as a computer server for the purpose of accessing a knowledge base and processing natural language queries. The different personalities are exposed to different users and see different knowledge bases (or altered views of the same knowledge base). The personalities are customized to suit the needs of the users. By handling a large number of personalities on a server, it is possible to accommodate and sustain the interests of a large number of users.

10 Claims, 3 Drawing Sheets

Personality flags:

| 1 | 2 | 3 | 4 | 5 | 6 | 7 | 8 | 9 | 10 |
|---|---|---|---|---|---|---|---|---|----|
| 0 | 0 | 0 | 1 | 1 | 0 | 0 | 1 | 0 | 0  |

Run-length encoding:

| 3 | 2 | 2 | 1 | 2 |
|---|---|---|---|---|

Fig. 3

MULTI-PERSONALITY CHAT ROBOT

BACKGROUND

This invention relates to artificial intelligence.

Simulating human intelligence in natural language interactions has long been a goal of artificial intelligence research. An early attempt was ELIZA. It was a computer program written by Joseph Weizenbaum to simulate a psychoanalysis session. A user (pretending to be a mental patient) would type a sentence of text (in English), and then ELIZA would respond with a sentence as a psychoanalyst might do. The interface was similar to what is now known as an instant messaging or chat program. It worked by having pre-programmed responses that were varied based on applying a pattern matching algorithm to the patient's last sentence.

More recent technologies have allowed chat robots (driven by computer programs) to more realistically mimic the responses of a human. A good example is A.L.I.C.E. (aka Alicebot), published by Dr. Richard Wallace. It won the 2000 and 2001 Loebner Prize by fooling some judges that it was a real person. The source code is readily available on the internet. The natural language information is stored in a knowledge database using a language called AIML (artificial intelligence markup language).

Applications of computerized natural language processing include online technical support. Companies sell products to customers who have questions, so they have technical support personnel who answer questions. In some cases, companies are able to use automation to answer the more common questions. The customer may ask a question in English, and a computer refers to a knowledge base to find an appropriate answer.

Another application is in web portals. For example, "Ask Jeeves" (www.ask.com) has a search engine that accepts natural language queries. Web portals like this often offer free services to the public, and then try to make money by selling advertising or customized services.

Each chat robot has its own personality. The personality is a function of the knowledge base, the rules for generating responses, and other robot implementation details. In commercial applications, different robots might be tuned for different types of users and queries.

Web servers commonly service many users simultaneously. If users wish to access different chat robots, and if each chat robot requires substantial computing resources, then multiple chat sessions might overwhelm the capabilities of the server.

There is a need for a computer system to be able to efficiently manage many different chat robots at once. Ordinary multi-tasking is one approach to managing multiple robots on a computer server, but each robot can require a lot of computer resources, and the multi-tasking of a number of robots can overload a computer.

There is also a need for web portals to offer more customized natural language services to users.

BRIEF SUMMARY OF THE INVENTION

The foregoing needs, and other needs and objects, are fulfilled by the present invention, which comprises, in one aspect, a method of simulating multiple personalities with one natural language database (also called a knowledge base). The database includes a linked set of nodes codifying natural language recognition features that are common to most of the personalities. In addition, each node is tagged with a set of flags that indicate whether the node is active for a given personality. The linked nodes are used for the pattern matching against input sentences. Each node represents a single word of the language. The collection of nodes and links are shared by multiple personalities and form a graph.

The personalities are indexed by a simple numbering scheme. A query to a personality causes a search on the shared graph, with the condition that particular nodes are handled in accordance with how the flags indicate the activity of those nodes for the particular personality.

Thus a shared graph can be used for many personalities. A large number of personalities are handled by using a run-length encoding of the flags at each node.

BRIEF DESCRIPTION OF THE FIGURES

FIG. 3 shows run-length encoding of a set of personality flags.

DETAILED DESCRIPTION OF THE INVENTION

Figure 1:
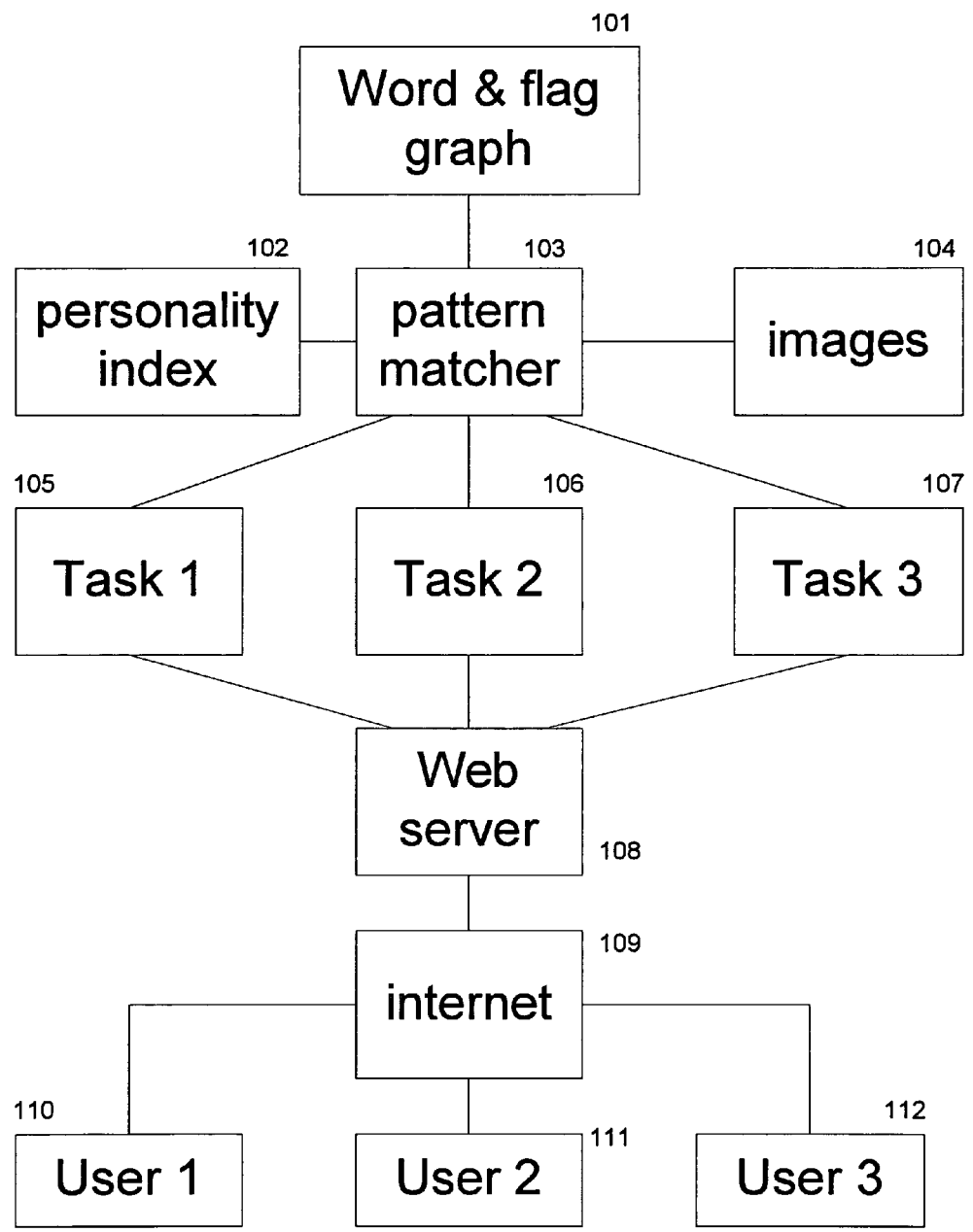
FIG. 1 shows a multi-personality server connected to several users.

A natural language processing chat robot (or chatbot) consists of a computer, a natural language interface, a pattern matcher, and a data structure holding various words, phrases, and relationships. FIG. 1 shows a system for handling several chatbots, along with a web interface 108 for several users. 110,111,112 The natural language words and personality flags are stored in the word & flag graph, 101 where they can be easily searched by the pattern matcher. 103 Databases of personality information 102 and images 104 can also be accessed. Interaction with User 1, 110 User 2, 111 and User 3 112 on a network is accomplished by having a web server, 108 and running one task 105, 106, 107 for each user. 110, 111, 112 Each task runs the pattern matcher 103 against the graph 101 to find matches, for a given personality.

In the preferred embodiment, the chatbots are implemented in the programming language Common Lisp because that language has very powerful capabilities for managing lists of data. Implementations in other languages like Java or C++ are also possible.

The graphs are preferably stored in an AIML file on the disk, and in a Lisp data structure representing the knowledge in (fast) memory.

The AIML also uses wild cards for pattern matching. The symbol "*" matches anything unless there is a better literal match. The symbol "_" matches anything even if there is a literal match.

The personalities might be divided into categories of knowledge. For example, one category might be answering computer technical support queries, while another might be answering medical queries. If the categories are very different, then they may not share very much of the knowledge base.

The implementation is preferably in the programming language Lisp. Lisp has the advantage that complex data structures are easily modified dynamically and shared across multiple tasks. It also allows discarded memory to be easily recycled by a process called garbage collection. Other programming languages like C++ or Java are also possible.

When multiple personalities share a substantial part of the knowledge base, then there is a graph that has nodes that are encoded for the applicable personalities.

Figure 2:
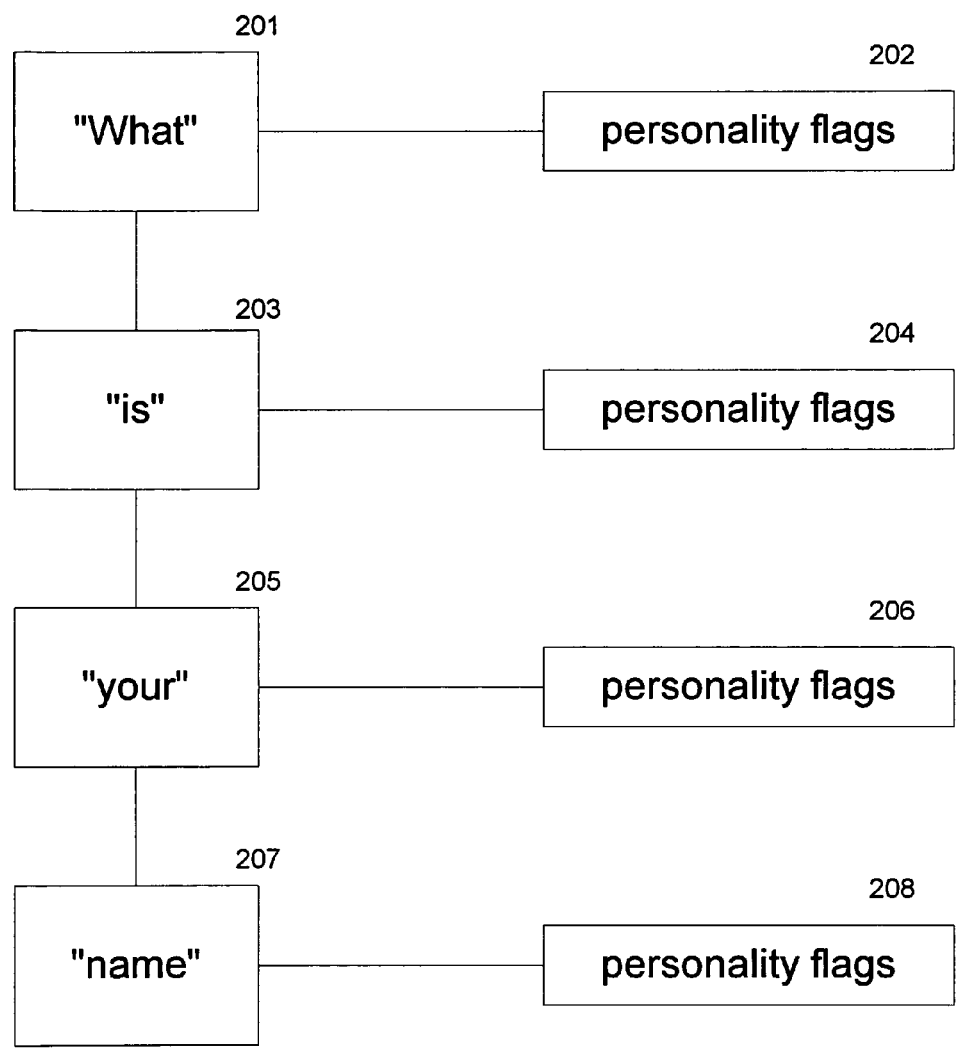
FIG. 2 shows a graph corresponding to a parsed English sentence, with flags for multiple personalities.

A knowledge base will typically be represented by a graph with thousands, or even millions, of nodes. This knowledge base might be shared by thousands of personalities. Each node is tagged so as to indicate which personalities are applicable, as in FIG. 2. The word "What" 201 is tagged with the personality flags. 202 Then the pattern matching algorithm for a given personality only searches those nodes that are applicable to that personality.

Because there could be a lot of personalities, the personality tags are compactly encoded. If there are 1000 personalities, then they are numbered from 1 to 1000. The numbering is in the order that they are created, or any other convenient order. Each node is tagged with run-length encoding of the personality flags.

FIG. 3 shows how the run-length encoding sequence is encoded. Each sequence is an array of 16-bit integers. Each integer represents a number of consecutive personality codes having the same flag value. Each flag value is just 0 or 1, where 1 indicates that the node applies to the given personality, and 0 otherwise. Eg, if the personalities (1,2,3,4,5,6,7,8,9,10) have the flags (0,0,0,1,1,0,0,1,0,0) for a given node, then these flags can be represented by the run-length encoded sequence (3,2,2,1,2). This sequence is interpreted as 3 0s, 2 1s, 2 0s, 1 1, and 2 0s. The sequence (3,2,0,0,2,1,2) gives the same result. A sequence of 100,000 zeros might be represented by (65536,0,34464). Decoding is just the reverse of encoding.

Other compact schemes for representing the flags are possible, such as using other compression techniques.

In some applications, a server simulates multiple robot personalities, with multiple users connected who are creating, editing, deleting, and interacting with the personalities on the fly.

Each personality is associated to categories of knowledge that are linked to the graph. In an Eliza-type robot, the categories have text information that is used in responses. A multimedia robot can also have links to pictures, speech, music, etc in the categories.

Once a server is loaded with software that can function as a multi-personality robot, then users can be given access to the personalities. A user might connect to the server as a web portal and choose a personality with which to interact. For example, an entertainment site might have personalities that mimic Elvis Presley or David Letterman.

A server may also have the option of allowing users to configure their own personalities. A user can directly edit the AIML that defines the personality so that certain types of questions will be answered in particular ways. Or he can also build on pre-packages AIML components that are made available by the server or provided elsewhere.

Users can interact with the personalities directly on a web interface that the server hosts, or through some intermediary. The intermediary could be another web server, or it might be an instant messaging client. Thus a user might relate to a bot across an instant messaging service, just as if he is communicating with another user.

The invention has been described in its preferred embodiments, but many changes and modifications may become apparent to those skilled in the art without departing from the spirit of the invention. The scope of the invention should be determined by the appended claims and their legal equivalents.

I claim:

1. A method for simulating multiple personalities, comprising the steps of:
   (a) representing each of several personalities as overlapping portions of a graph in computer memory;
   (b) representing words as nodes in said graph;
   (c) using flags at each said node to associate said node to a subset of said personalities; and
   (d) matching queries against said graph by scanning for nodes that are active for a given personality;
   whereby a multitasking computer system can process natural language sentences associated to a multitude of personalities.

2. The method of claim 1, further comprising serving links to images along with said responses.

3. The method of claim 1, further comprising compressing said flags at each said node into an abbreviated encoding.

4. The method of claim 3, where said abbreviated encoding is a run-length encoding.

5. A computer-readable medium storing a computer program implementing the method of claim 4.

6. The method of claim 1, further comprising adding a new personality by adding new nodes and extending said flags at said common nodes.

7. The method of claim 1, further comprising adding and deleting personalities, and performing garbage collection to reclaim memory from deleted personalities.

8. The method of claim 1, further comprising using Lisp programming to access said graph and program said pattern matching.

9. The method of claim 1, further comprising communicating across a messaging service.

10. A computer-readable medium storing a computer program implementing the method of claim 1.

* * * * *